United States Patent
Sander et al.

(10) Patent No.: US 6,282,973 B1
(45) Date of Patent: Sep. 4, 2001

(54) SELECTOR FOR A VEHICLE TRANSMISSION AS WELL AS SWITCH MODULE THEREFOR

(75) Inventors: Edmund Sander, Leonberg; Jens Gruener, Stuttgart, both of (DE)

(73) Assignee: Dr. Ing. h.c.F. Porsche AG, Weissach (DE)

(*) Notice: Subject to any disclaimer, the term of this patent is extended or adjusted under 35 U.S.C. 154(b) by 0 days.

(21) Appl. No.: 09/406,681

(22) Filed: Sep. 27, 1999

(30) Foreign Application Priority Data

Sep. 26, 1998 (DE) .............................. 198 44 276

(51) Int. Cl.[7] .................................. F16H 59/02
(52) U.S. Cl. .................... 74/473.18; 74/473.33
(58) Field of Search ............... 74/473.18, 473.33, 74/473.22, 473.35

(56) References Cited

U.S. PATENT DOCUMENTS

| | | | |
|---|---|---|---|
| 5,009,128 | * 4/1991 | Seidel et al. | 74/473.18 |
| 5,799,539 | * 9/1998 | Haase | 74/473.18 |
| 5,845,535 | * 12/1998 | Wakabayashi et al. | 74/473.18 |
| 5,899,115 | * 5/1999 | Kataumi et al. | 74/473.18 |
| 5,927,150 | * 7/1999 | Hirano et al. | 74/473.18 |

FOREIGN PATENT DOCUMENTS

| | | |
|---|---|---|
| 39 27 248 | 8/1989 | (DE) . |
| 42 17 773 | 5/1992 | (DE) . |
| 0 413 115 | 6/1990 | (EP) . |
| 0 784 169 | 1/1997 | (EP) . |
| 0 826 908 | 8/1997 | (EP) . |
| 0 846 897 | 12/1997 | (EP) . |
| 2 756 783 | 12/1996 | (FR) . |

* cited by examiner

Primary Examiner—Charles A Marmor
Assistant Examiner—Saúl Rodríguez
(74) Attorney, Agent, or Firm—Crowell & Moring, L.L.P.

(57) ABSTRACT

A selector for a vehicle transmission, includes a selector lever which is movable in two shift gates. In the first shift gate, automatic positions of the transmission can be selected using the selector lever, while gear ratios can be selected sequentially by the selector lever in the second shift gate. For that purpose, switches are provided in the second shift gate for detecting the sequential selection processes.

9 Claims, 2 Drawing Sheets

SELECTOR FOR A VEHICLE TRANSMISSION AS WELL AS SWITCH MODULE THEREFOR

BACKGROUND OF THE INVENTION

The present invention relates to a selector for a vehicle transmission, with a selector lever being movable in two shift gates. In the first shift gate, automatic positions of the transmission can be selected with the selector lever, and in the second shift gate, gear ratios can be selected sequentially by the selector lever. For this purpose, switches are provided in the second shift gate to detect the sequential selection processes.

A switching or selector device is described, for example, in DE 39 27 248 C1. In this device, the selector lever is accommodated in the second shift gate between two spring-loaded pins. As the selector lever is pivoted against the spring force, the pins actuate laterally-located microswitches. The microswitches and the pins are located on a common carrier plate which simultaneously forms the guide for the selector lever and serves as a cover of a housing of the selector that is open at the top. The carrier plate is bolted to the housing for that purpose.

SUMMARY OF THE INVENTION

An object of the present invention is to provide a selector that is greatly simplified in terms of assembly.

This object has been achieved according to the present invention by providing that in a selector the switches are combined with spring-loaded pins to center the selector lower in a neutral center position. A switch module formed thereby is provided with a bore to receive the pin. A counterbearing for the pin is held in an opening whose diameter is as least as large as the outside diameter of the pin.

The selector proposed combines the switches and pins into a switch module. A switch module of this kind can be assembled in advance separately from the final assembly of the selector and adjusted. It is especially important in this regard that the switches be actuated by the pins so that the switches must be adjusted relative to the pins. At the same time, all of the electrical devices in the selector are combined into a module so that a single cable end can be associated with this module.

The switch module according to the present invention has, as above noted, a through bore to receive the pins. An opening in which a counterbearing for the springs for loading the pins is located has a diameter chosen to be large enough that the pins can be guided through this opening. By configuring the switch module in this manner, the pins can be installed from the outside of the switch module and has the advantage of being able to replace the pins even when the switch module has been assembled.

The selector switch module can be configured so that a gap formed by the first shift gate is bridged. For this purpose, the switch module is additionally connected with an opposite wall. Bridging the gap increases the rigidity of the housing of the selector, with the manufacture of the housing being simplified by the fact that a gap of this kind can be provided.

To fasten the switch module to the housing of the selector, conical pins are provided on the top of the housing. The pins engaging matching conical openings. The conical pins hold the switch module on the housing with zero play. Thus, when the pins and switches are actuated by the selector lever or during the bridging of the gap, additional play is avoided.

In addition, the selector receiving points for the housing can be provided with bores to fasten the switch module to the housing. The latching pins of a cover for the selector engage into the bores. The latching pins pass through the openings of the switch module, and the switch module is secured by fastening the cover to the housing without additional fastening apparatus being required for that purpose. Even if latching pins are generally sufficient for fastening the cover, it may be necessary under certain conditions to fasten the cover to the housing using expanding bolts, screws, or the like. Also here, however, no additional measures are required for fastening the switch module.

Regarding the switch module, a circumferential bead can be provided endwise on the pin and have an outside diameter greater than the outside diameter of the pin. This configuration of the pins ensures that the pins assume a specific position when assembled. Thereby, a movement of the selector lever caused by pins projecting too far is reliably avoided. Finally, the counterbearing for the spring can be held in the opening with a quarter-turn lock. In addition to the simplified assembly, the quarter-turn lock advantageously assumes a specific position in the axial direction following its installation.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
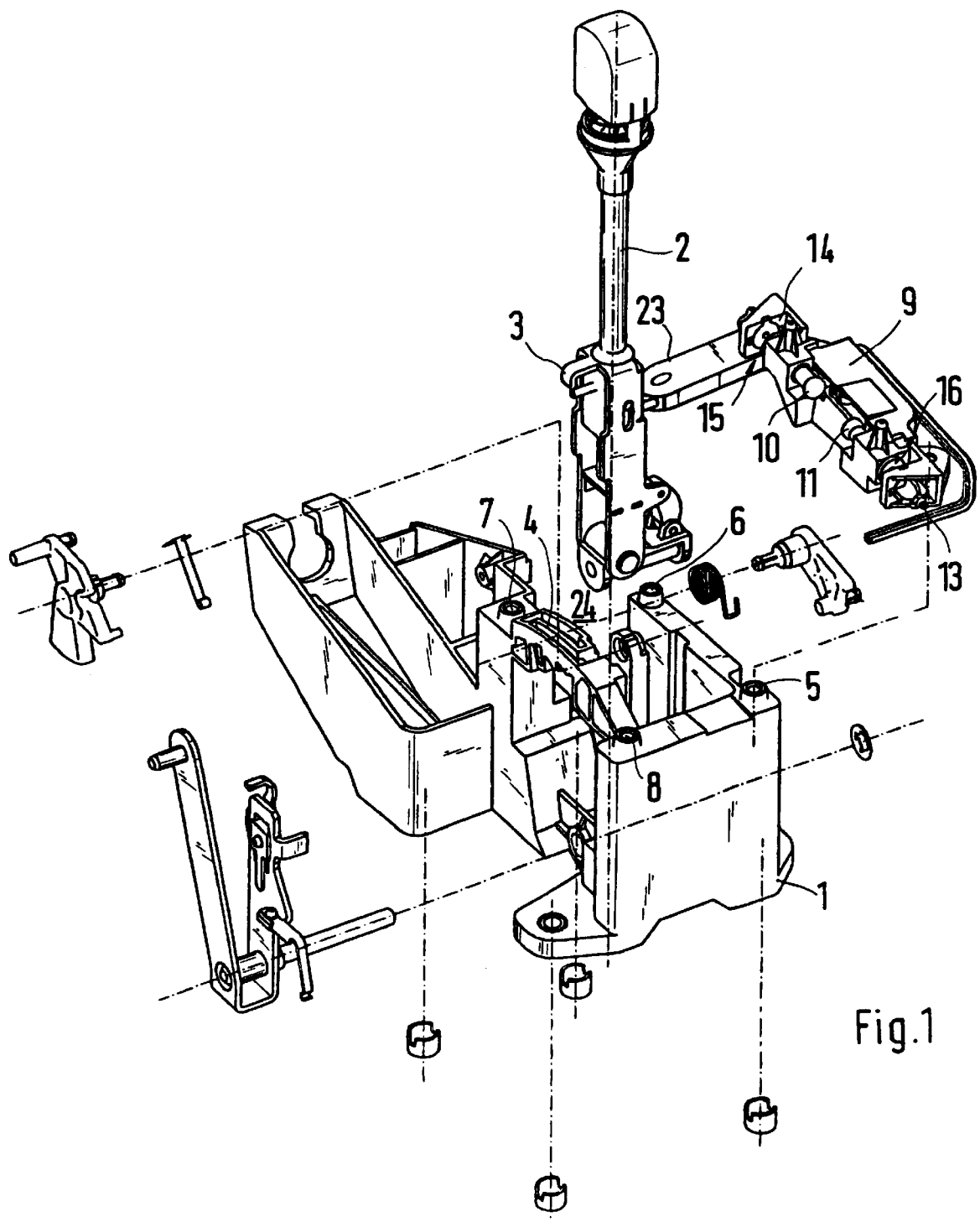
FIG. 1 is an exploded perspective view of the selector of the present invention.

A housing 1 of the selector shown in FIG. 1 receives a selector lever 2 secured pivotably in two gates. To guide the selector lever 2 on housing 1, a guide finger 3 is provided on the selector lever 2 to engage a groove 4 on the housing 1. In addition, four conical fastening points 5, 6, 7, 8 are provided on the top of housing 1. The fastening points each have a central bore in which a cover (not shown) is held by a snap connection.

Figure 2:
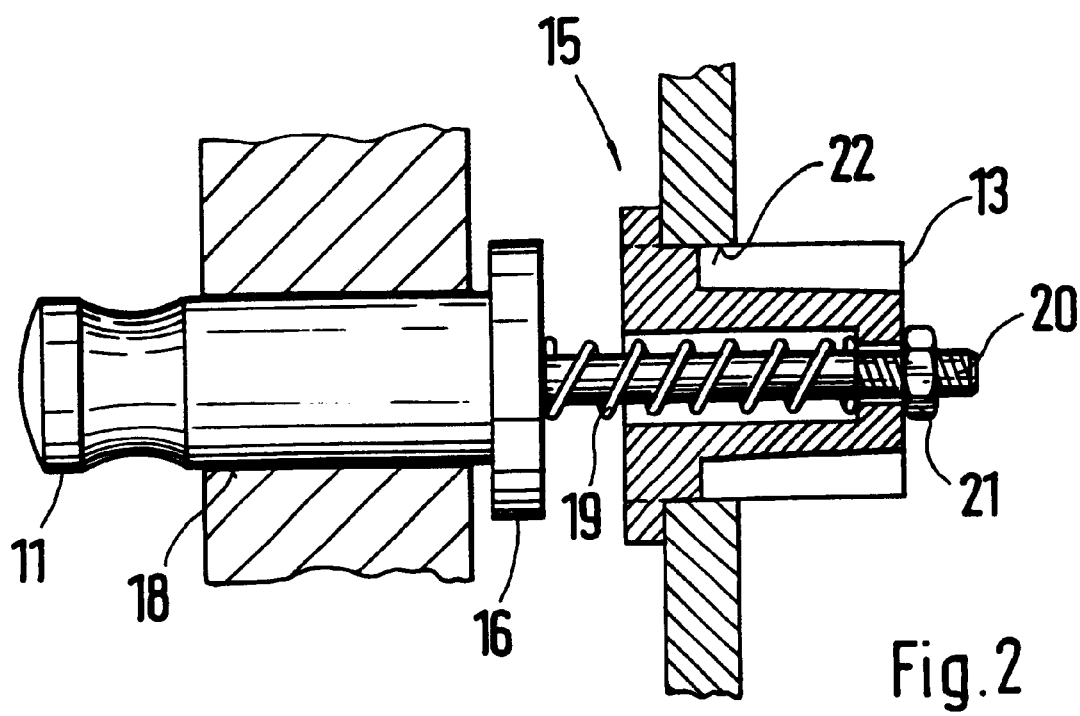
FIG. 2 is a detailed section lateral view of the mounting of a pin.

A switch module 9 is provided with spring-loaded pins 10, 11. The pins hold the selector lever 2 centered in a neutral center position in the second gate. As shown in greater detail in FIG. 2, the pin 11 is guided in a bore 18 whose diameter matches the outside diameter of the pin 11. A bead 16 is provided endwise on the pin 11 and has a diameter which is greater than the diameter of bore 18 so that the pin 11 cannot pass through bore 18. A counterbearing 13 is mounted opposite the pin 11 on the housing 1. The counterbearing 13 receives a spring 19 that fits between the counterbearing 13 and the bead 16 of the pin 11. A pin 20 connected with pin 11 is guided inside the spring 19 and passes through the counterbearing 13. The pin 20 has a nut 21 on the outside of counterbearing 13. The initial position of pin 11 can be finely adjusted using the nut 21, and the neutral center position of selector lever 2 can thus be changed.

An opening 22 is provided for mounting the counterbearing 13, with the inside diameter of the opening being made larger than the outside diameter of the bead 16. A conventional quarter-turn lock 15 is provided to lock the counterbearing 13 in the opening 22.

The pin 11, together with the counterbearing 13, the pin 20, the spring 19, and the nut 21, form a module that can be preassembled and can be introduced from outside into switch module 9 even when the switch module 9 has been mounted.

For manufacturing reasons, the housing 1 is configured as a U-shaped frame in the vicinity of the selector lever 2. To increase the rigidity of housing 1, a bridge 23 is provided on the switch module 9 to bridge a gap 24 of the housing 1, forming a shapewise connection between fastening points 6, 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A selector for vehicle transmission, comprising a movable selector lever, wherein switches are operatively arranged in relation to the selector cover to detect shifting processes and are associated with spring-loaded pins to center the selector lever in a neutral center position, thereby forming a switch module, wherein conical pins are provided on the top of a housing of the selector to engage matching conical openings on the switch module.

2. A selector according to claim 1, wherein the switch module extends over a gap formed gate in a housing of the selector, and is connected with an opposite wall thereof.

3. The selector according to claim 1, wherein latching pins of a selector cover pass through the conical openings of switch module into bores provided within the conical pins.

4. A selector according to claim 3, wherein the switch module extends over a gap formed in a housing of the selector, and is connected with an opposite wall thereof.

5. A switch module, for a selector comprising a selector lever arranged to be movable in two shift gates and in with automatic positions of the transmission being selectable in a first of the shift gates and gear ratios being selectable sequentially in a second of the shift gates, wherein switches are provided in the second gate to detect shifting processes, and the switches are combined with spring-loaded pins to center the selector lever in a neutral center position, thereby forming a switch module wherein the spring-loaded pins are opposite one another for centering the selector lever in the neutral center position, a bore is provided to receive pin, with a diameter of said bore being sized to match a matching of the received pin, and a counterbearing for a spring is held in an opening having a diameter which is as least as large as an outside diameter of the received pin, wherein a circumferential bead is provided endwise on the received pin, with the outside diameter of the bead being larger than the outside diameter of the received pin.

6. The switch module according to claim 5, wherein the counterbearing is held in the opening by a quarter-turn lock.

7. The switch module according to claim 6, wherein a circumferential bead is provided endwise on the received pin, with the outside diameter of the bead being larger than the outside diameter of the received pin.

8. A switch module according to claim 7, wherein the switch module extends over a gap formed in a housing of the selector, and is connected with an opposite wall thereof.

9. The switch module according to claim 8, wherein conical pins are provided on the top of a housing of the selector to engage matching conical openings on switch module.

* * * * *